April 1, 1930.   N. J. N. OLSON   1,752,571
AUTOMOBILE CAMP SHELTER
Filed Sept. 14, 1927   2 Sheets-Sheet 1
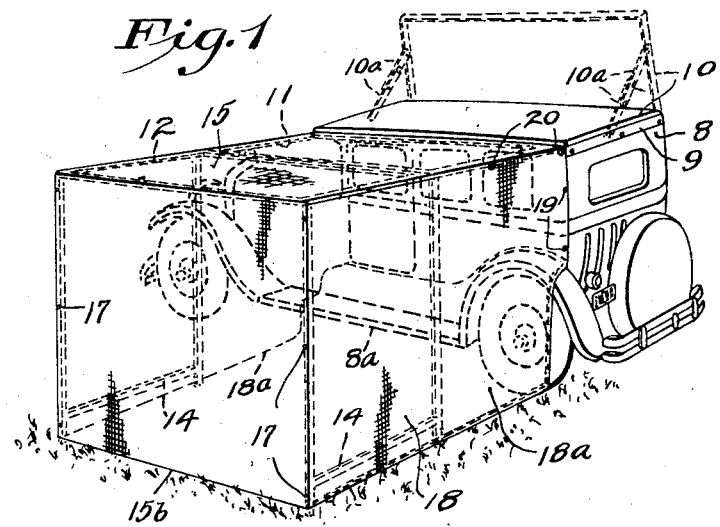
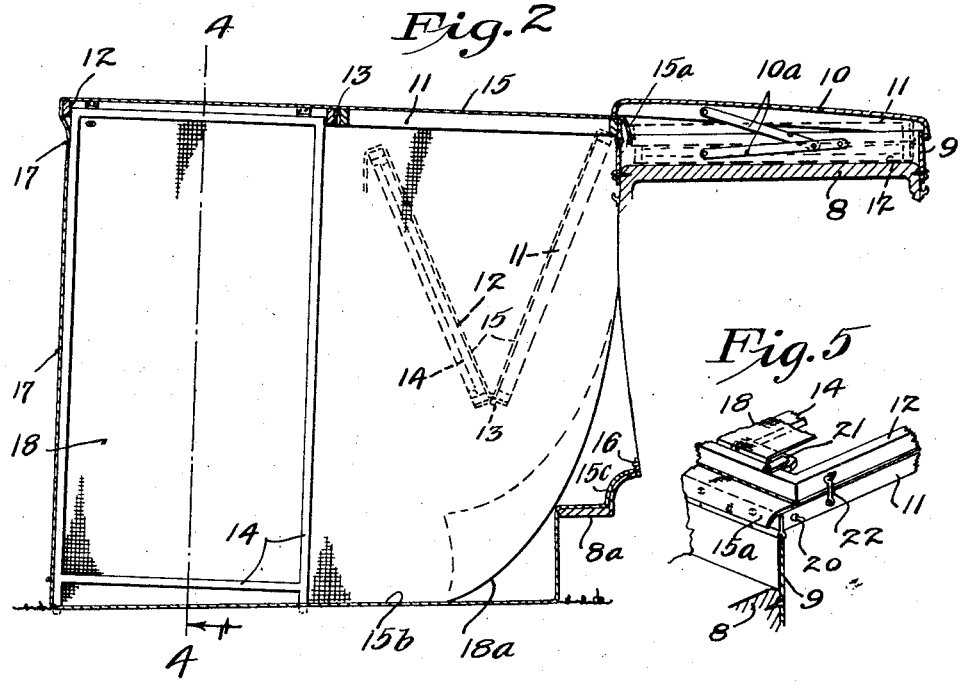
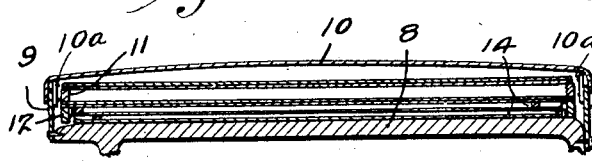
Inventor
N. J. Norman Olson
By his Attorneys
Williamson Reif & Williamson April 1, 1930.  N. J. N. OLSON  1,752,571
AUTOMOBILE CAMP SHELTER
Filed Sept. 14, 1927    2 Sheets-Sheet 2
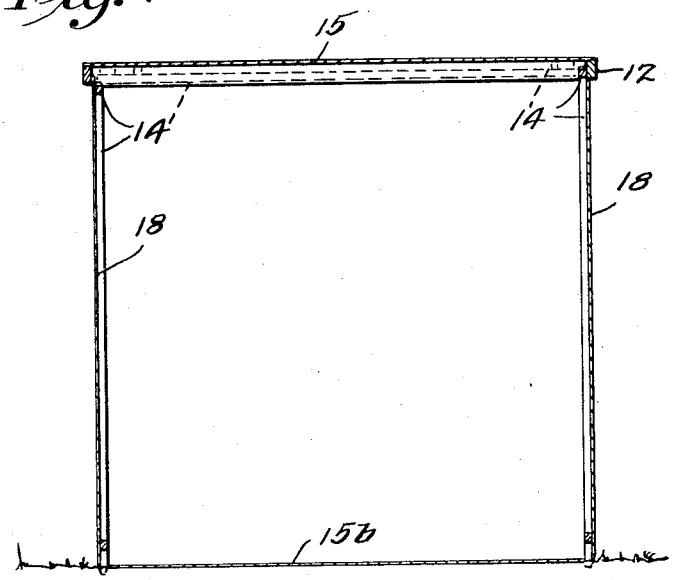
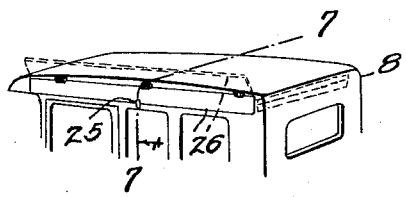
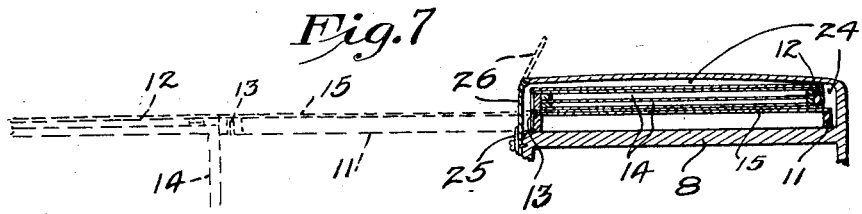

Patented Apr. 1, 1930

1,752,571

UNITED STATES PATENT OFFICE

NICHOLAY J. NORMAN OLSON, OF MINNEAPOLIS, MINNESOTA

AUTOMOBILE CAMP SHELTER

Application filed September 14, 1927. Serial No. 219,447.

This invention relates to tent structure and especially to automobile tents.

My invention has for its main object to provide a highly efficient tent structure for use in co-operation with an automobile which may be very quickly set up and which may be compactly folded and disposed out of sight on the automobile top.

Another object is to provide an automobile tent supported from and connected with the top of an automobile utilizing one side of the automobile as a closure for one end of the tent which may be set up in a few minutes without requiring the use of guys, ropes or stakes and which will provide a relatively large tent of rectangular type.

It is a further object to provide a structure of the class referred to which may be compactly carried by the top of the automobile without disfiguring the ornate appearance thereof.

These and other objects will be apparent from the following description made in connection with the accompanying drawings wherein like reference characters refer to similar parts throughout the several views and in which Fig. 1 is a perspective view of an embodiment of the invention applied to an automobile and set up for use;

Fig. 2 is a vertical cross section through the tent structure and the automobile top, the folding of the frame members being illustrated in dotted lines;

Fig. 3 is a cross section of the device compactly folded when disposed within a shallow compartment on the automobile top;

Fig. 4 is a vertical section taken on the line 4—4 of Fig. 2;

Fig. 5 is a perspective view showing portions of the folding tent frame in compact position ready to be disposed within the tray or compartment in the top of the automobile;

Fig. 6 is a perspective view of the top of an automobile having a slightly different form of my invention applied thereto; and Fig. 7 is a vertical cross section taken on the line 7—7 of Fig. 6 showing the tent structure folded and disposed within the top and the set up portion thereof in dotted lines.

In Figs. 1 to 5, inclusive, my device is shown applied to an automobile of the closed car type having the usual substantially rigid top 8. I provide a shallow compartment of substantially the dimensions of top 8 in which my tent structure is housed and hidden from sight compactly folded. As shown, this compartment comprises a shallow box-like tray 9 which may snugly fit the top 8 to which a lid or cover 10 is hinged, said hinges preferably being disposed at one longitudinal side of top 8 leaving the opposite longitudinal side of tray 9 unobstructed for removal of the tent structure. If desired, toggle links 10a may be supplied between lid 10 and tray 9 to hold the lid in raised position.

In a general way my tent structure comprises a light frame having a pair of hinged top sections the outermost of which carries a pair of inwardly and oppositely foldable leg sections adapted to support the outer portion of the tent from the ground.

Thus, in the drawings a substantially rectangular frame section 11 of slightly smaller dimensions than the inner periphery of compartment 9 is hinged along one of its longitudinal edges to the unobstructed longitudinal edge of the compartment of the tray 9, said hinges being mounted to permit section 11 to be swung inwardly and be housed within the space within said compartment. To the outer longitudinal edge of frame section 11 a second rectangular frame section 12 is hinged, hinges 13 being disposed with their axes adjacent the upper edges of frame sections 11 and 12 whereby outer frame section 12 may be swung upwardly and against frame section 11 as shown in dotted lines in Fig. 2. With the mounting of hinges 13 as described the adjacent edges of frame sections 11 and 12 abut when the frame is set up as shown in Fig. 2 constituting stops to hold said frame sections rigid with respect to each other. Substantially rectangular leg frame sections 14 are hinged within frame section 12 adjacent the lateral sides thereof adapted to be folded inwardly and oppositely to snugly fit the interior of frame section 12 and adapted to be extended in substantially vertical position as shown in Fig. 2 to support the tent.

As illustrated, leg sections 14 are hinged to the inner longitudinal sides of frame section 12 adjacent the ends, the axis of one of said leg sections being disposed above the axis of the other to permit compact folding within frame section 12. A continuous elongated sheet of canvas, sheeting, or other suitable material 15 is secured at one of its ends 15$^a$ to the inner longitudinal edge of frame section 11 and passes over frame sections 11 and 12 and over the outer edges of leg frames 14 and beneath said leg sections forming the floor of tent 15$^b$, its lower edge 15$^c$ covering the running board 8$^a$ and splash apron of the automobile and being secured by fasteners 16 to one side of the car. It is, of course, apparent that hinges or separate sheets may be substituted for the continuous strip or sheet of material 15 serving the same purpose and covering the frame in the same manner. If a single sheet of canvas or other material is used as illustrated, I prefer to attach the material to the longitudinal edge of frame section 12 adjacent hinge 13 and also to the outer edges of leg frames 14. As shown, the side of the tent formed by sheet 15 is secured to leg sections 14 by means of snap buttons 17.

Assuming the front closure of the tent structure to be formed by the side of the automobile and the rear closure to be formed by the vertical portion of the sheet material 15, I provide vertical tent sides by securing sheets of material 18 such as canvas sheeting or other suitable material to the outer surface of the rectangular leg frames 14. The sheets 18 are of sufficient length to form flaps 18$^a$ extending from the forward edges of the leg frames to the side of the automobile and snap studs 19 may be provided on the outer side of the automobile body to receive co-operating snap buttons on the forward edges of flaps 18$^a$ thereby securing and closing the entrances of the tent. The upper edges of the flaps 18$^a$ extending between leg frames 14 and the sides of the automobile are supported from and secured to the lateral sides of frame section 11 by means of suitable snap buttons 20 as shown in Fig. 1. Preferably the outer or rearward legs of frames 14 are of slightly greater height than the inner legs and the height of the automobile to incline the top of the tent formed by the sheet 15 to permit drainage of water.

It will be seen that when set up the tent structure is supported from the top of the automobile at its forward and upper end and from the leg frames 14 at its rear end. Frame sections 11 and 12 are rigidly disposed relatively to each other and leg sections 14 engage the ground at their lower ends and are further prevented from swaying due to the fact that the top frame is hinged to the longitudinal edge of the top of the car. Sides 18 of the tent further re-enforce the structure and prevent damage or falling due to wind or storm. To fold the tent structure for travel it is only necessary to unsnap the lower edge 15$^c$ of sheet 15, remove the sheet from beneath the leg sections, fold leg sections 14 inwardly and oppositely to snugly fit within the interior of frame section 12 as shown in dotted lines in Fig. 2 and fold frame section 12 upwardly upon frame section 11. Leg sections 14 may be secured in folded position within frame section 12 by suitable turn buttons 21 and frame sections 12 and 11 may be held together by means of hook and eye fastening devices 22. The folded tent frame may then be swung upwardly and into the compartment formed by tray 9 and lid 10 may then be lowered completely covering the tent structure. In the folding of the frame sections the elongated strip of material 15 is folded backwardly upon the upper or top portion thereof and doubled by the folding of frame section 12 upon frame section 11 and the flaps 18$^a$ are folded backwardly against the leg frames 14, said sheets, of course, being properly positioned before the several frame sections are folded.

In setting up the tent, the operation above described is reversed, the folded frame structure being first swung from its housing compartment, sections 11 and 12 unfolded and leg sections 14 being swung downwardly in contact with the ground.

The several frame sections may be made of wood or aluminum or any other suitable light material and obviously when folded in the manner set forth will occupy only the thickness of the two frame sections 11 and 12. In actual construction the thickness of the assembled structure has been made less than two inches. The device, therefore, occupies little space on the top of the machine and is not unsightly.

In Figs. 6 and 7 a slightly different form of the invention is illustrated similar in all respects to the form previously described but fitting into the housing compartment in a different manner. The structure of the tent frame, supporting leg sections and top sections is identical with the form previously described so further explanation thereof is thought unnecessary. However, when said frame sections are folded together as shown in Fig. 7 the compact device may be made to slide laterally and horizontally within a shallow compartment or pocket 24 formed in the top of the automobile. I contemplate either forming a special top on the automobile to form said pocket or attaching the compartment to the top of motor cars now in use. The inner longitudinal edge of the frame member 11 in this form of the device will be supported from the top 8 of the automobile as before and a stop member 25 or any other equivalent may be provided adjacent the slotted portion of the top to limit the outward sliding movement of the frame section 11 when engaged with the inner side thereof. Stop member 25 may also be utilized to secure a narrow door 26 closing compartment 24.

From the foregoing description it will be seen that I have invented a simple but highly efficient automobile tent adapted to be compactly carried upon the top of a closed automobile and adapted to be quickly unfolded and set up without the use of stakes, guys or other extraneous supporting and embracing means.

The tent formed with my structure is substantially box-shaped and provides ample room for several occupants permitting said occupants to stand erect at all points within the structure. The automobile on which applied co-operates to form a support for the forward end of the tent roof as well as to provide a closure for the forward side of the tent and a place for the leg sections. In actual operation I have set up and packed my device in less than four minutes' time. Provision is made to adequately protect the structure when collapsed from rain and inclement weather without detracting from the ornamental appearance of the automobile on which applied. In fact the form of my invention illustrated in Figs. 6 and 7 may be applied to the specially constructed automobile top in such manner that the top will appear similar to the standard tops in use at this time.

It will, of course, be understood that various changes may be made in the form, details, proportions and arrangement of the parts without departing from the scope of my invention.

What is claimed is:

1. In combination with an automobile, structure of the class described comprising a frame section having a connection with the top of the automobile for disposition in said top and for projection from one side thereof, another frame section hinged at said first mentioned frame section along one of its edges and foldable thereagainst, a pair of oppositely foldable side sections hinged to said last mentioned frame section along the sides adjacent said hinged edge, said side sections being foldable within said last mentioned section, foldable wall material connected to said first mentioned frame section and being adapted to cover the top of the structure and the space at the rear between said side sections, and foldable wall material covering the sides of the frame structure, said frame sections and side sections together with said wall material being compactly foldable into a relatively thin bundle connected with the top of the automobile and adapted to be carried thereupon.

2. In combination with the top of an automobile, structure of the class described comprising a substantially rectangular frame section having its forward longitudinal edge connected to and supported from said automobile top, a second rectangular frame section having hinged connection along one of its longitudinal edges with said first mentioned frame section and adapted to be folded against said first mentioned section, a pair of oppositely foldable side sections having hinged relation with the lateral sides of said second mentioned section and foldable compactly therewithin, a continuous sheet of wall material connected with said first mentioned frame section and foldable to cover the top and rear of the frame structure formed when said frame sections and side sections are set up and foldable wall material carried by said side sections adapted to cover the space between the rear of the frame structure and the opposing side of the automobile, said wall material being foldable with said frame sections to form a compact relatively thin rectangular bundle movable to be supported and secured upon the top of the automobile.

3. In combination with the top of an automobile, structure of the class described comprising a frame section having a connection with said automobile top adjacent one of its longitudinal edges to permit disposition of said frame section upon said automobile top or for projection with one side thereof, another frame section hinged to said first mentioned frame section along the other longitudinal edge thereof, a pair of side sections adapted to be disposed in compact position against said last mentioned frame section and adapted to be set up in substantially vertical position to support said last mentioned frame section, a continuous sheet of foldable material secured to one of said frame sections and adapted to extend about said frame sections and the rear portions of said side sections and to lie on the ground below said frame sections to constitute a roof, rear wall and floor of the structure, and means for covering the sides of said structure.

4. In structure of the class described, a top wall connected to the top of an automobile and projectable from one edge of said top, rectangular side wall sections hinged to opposite edges of said top wall on axes extending at right angles to said edge of said top, said side wall sections being adapted to be oppositely folded inwardly against said top section and being adaptable for substantially vertical position to support said top section, and means for covering the area defined by the projecting edge of said top section and the outwardly disposed vertical edges of said side sections.

5. In structure of the class described, a top wall connected to the top of an automobile and adapted to be supported horizontally thereby, said top comprising a pair of hinged wall sections, one of said sections being connected for projection horizontally from said top and said other section being hinged to the outward longitudinal edge of said first mentioned section, rectangular side wall sections hinged to the opposite lateral edges of said last mentioned top section and being adapted to be oppositely folded inwardly against said top section and to be disposed in a vertical position for supporting said top wall, and means connected with said top wall for covering the area defined by the projecting longitudinal edge of said second top section and the outwardly disposed vertical edges of said side sections.

6. In structure of the class described, a top wall connected to the top of an automobile and projectable from one edge of said top, said top wall including a rectangular frame, side wall sections hinged to opposite edges of said frame and swingable within said frame on axes extending at right angles to said edge of said top, each of said side wall sections including a rectangular frame having longitudinal sides provided with projecting legs at their free ends, said legs being adapted to engage the ground to support the entire device, and means for covering the area defined by the projecting edge of said top section and the outwardly disposed vertical edges of said side sections.

In testimony whereof I affix my signature.
NICHOLAY J. NORMAN OLSON.